United States Patent [19]

Bliss

[11] 4,413,968
[45] Nov. 8, 1983

[54] EXTRUSION DIE METERING DEVICE

[75] Inventor: William R. Bliss, Wilmington, Del.

[73] Assignee: Thiokol Corporation, Chicago, Ill.

[21] Appl. No.: 357,224

[22] Filed: Mar. 11, 1982

[51] Int. Cl.³ .............................................. B29F 3/06
[52] U.S. Cl. ................................... 425/198; 264/150;
264/209.8; 425/190; 425/192 R; 425/199;
425/376 A; 425/464; 425/466; 425/467
[58] Field of Search ............ 425/145, 190, 198, 192 R,
425/199, 376 A, 461, 466, 467, 463, 464;
264/330, 177 R, 150, 209.8, 177 F

[56] References Cited

U.S. PATENT DOCUMENTS

| 435,842 | 9/1890 | Lamm | 264/330 |
|---|---|---|---|
| 2,194,589 | 3/1940 | Kunz | 425/467 |
| 2,308,552 | 1/1943 | Spinozzi | 425/199 |
| 2,597,638 | 5/1952 | Higbie | 425/467 |
| 2,900,668 | 8/1959 | Hubner et al. | 264/177 R |
| 2,908,037 | 10/1959 | Harkenrider | 425/199 |
| 2,939,176 | 6/1960 | Adelman | 425/145 |
| 2,971,219 | 2/1961 | Hill | 425/463 |
| 3,073,242 | 1/1963 | Hewson | 264/330 |
| 3,095,607 | 7/1963 | Cobb, Jr. | 264/177 F |
| 3,205,286 | 9/1965 | Black | 264/330 |
| 3,224,317 | 12/1965 | Gould | 264/150 |
| 3,407,437 | 10/1968 | Lenk | 425/376 A |
| 3,447,203 | 6/1969 | Campbell | 425/466 |
| 3,778,217 | 12/1973 | Bustamante et al. | 425/467 |
| 3,778,495 | 12/1973 | Woolley | 425/467 |
| 3,981,657 | 9/1976 | Orso et al. | 425/199 |
| 4,081,232 | 3/1978 | Pemberton et al. | 425/467 |
| 4,118,167 | 10/1978 | Lund et al. | 425/467 |
| 4,217,083 | 8/1980 | Machuque | 425/199 |
| 4,290,989 | 9/1981 | Topor et al. | 425/376 A |
| 4,362,683 | 12/1982 | Otsuka et al. | 425/376 A |

FOREIGN PATENT DOCUMENTS 1577201  8/1969  France ............................... 425/467

*Primary Examiner*—Jeffery R. Thurlow
*Attorney, Agent, or Firm*—Gerald K. White

[57] ABSTRACT

The material flow within an extrusion die body is adjusted by a metering device to alter the product perforation pattern of an extrusion product produced in the extrusion die without changes of or modifications to any of the various other parts of the extruder system being required. The extruder system is an apparatus which includes, in addition to a hydraulic cylinder powered press, a basic extrusion die, a die body, a set of perforation forming die pins and a ported cover or pin support plate.

23 Claims, 9 Drawing Figures

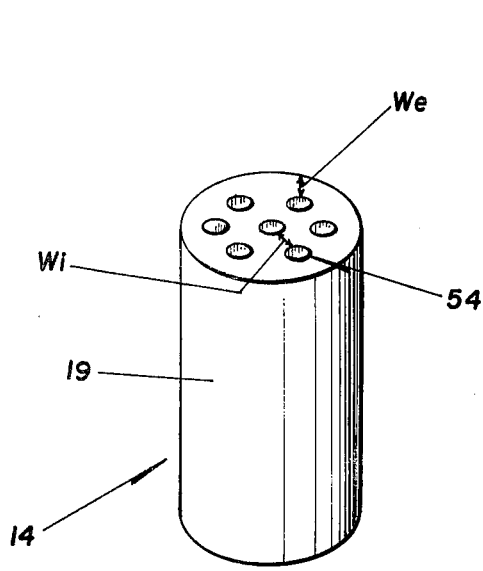
Fig. 5
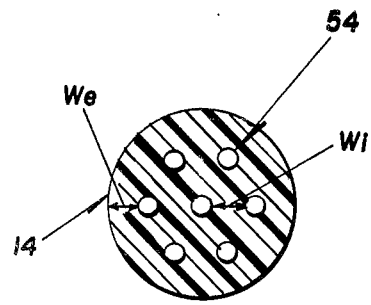
Fig. 6
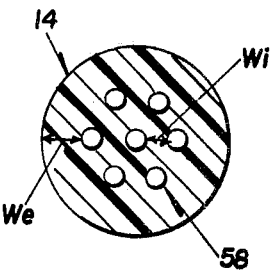
Fig. 7
Fig. 8
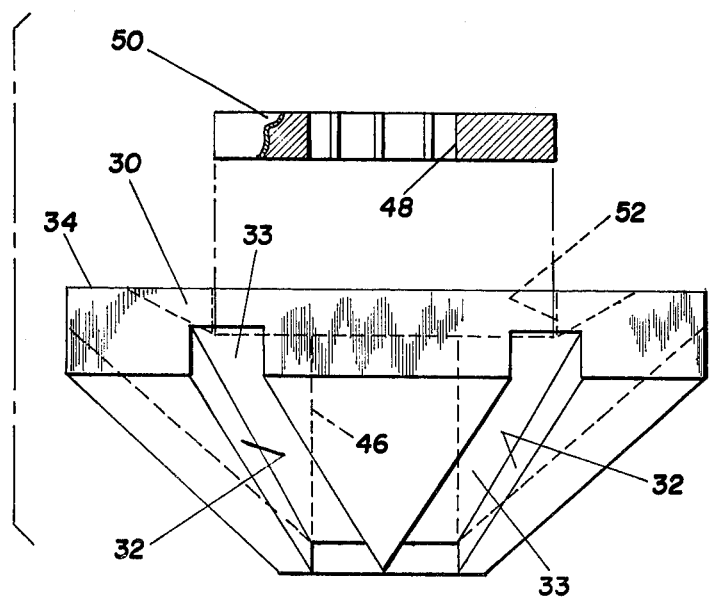
Fig. 9

EXTRUSION DIE METERING DEVICE

BACKGROUND OF THE INVENTION

1. Field of the Invention

The present invention relates to extrusion apparatus for producing elongated, perforated products wherein the perforations are formed in co-extending relation in predetermined patterns. More particularly, this invention relates to extrusion product flow control or metering devices for use with the aforementioned apparatuses wherein the pattern of the perforations can be varied without extensive modification being required to the apparatus or its components.

2. Description of the Prior Art

It is known in the art to form elongated articles by extrusion with one or more co-extensive perforations internally formed therein. For example, gun propellants, usually formed by extrusion from curable, plastic compositions of a solid explosive finely dispersed in a binder material, also usually contain several internal, co-extensive perforations arranged in a predetermined pattern. These compositions are highly viscous materials formed by means of an extrusion apparatus through an extrusion die into elongated, continuous strands which are thereafter collected in a container or laid onto a rotating aluminum table, or "skid", which is coated with a suitable release agent, and thereafter cured. After curing the strands are cut to pellet sized lengths in a cutting machine for use as gun propellant in artillery shells and the like.

The extrusion die of the apparatus normally is contained in a die body of the machine having a central bore as an extrusion passage. A counterbore or entrance chamber is usually provided in the body communicating with the bore and a cover or support plate is installed as a closure for the chamber. In the usual instance, one or more perforations or extrusion holes are formed in the cover through which the extrusion material flows before entering and filling the chamber and the central extrusion passage, or bore in the die body. The size and shape of the bore, in general, corresponds to and thereby determines the size and configuration of the extrusion product.

To form the co-extending perforations, the cover or support plate carries a plurality of pins fixed at one end and supported in the cover in cantilever fashion, the free ends of the pins extending into and through the chamber and into the extrusion hole or bore in the die body. The pins are arranged as mandrels in a "bolt circle" pattern and the extrusion product flows around and between them forming the perforations in a pattern determined by the number and placement of the pins in the bolt circle. The number of pins used corresponds to the number of perforations desired. The presence of perforations in a propellant product is desired to provide increased burning surface and to insure the propellant is fully consumed and burned when the gun is fired. In general, the preferred perforation pattern is one with seven perforations arranged in a bolt circle configuration of six perforations surrounding the seventh in the center.

Heretofore it has always been difficult to extrude elongated products using the aforementioned pins as mandrels for forming the perforations owing to the fact that their extreme lengths compared to their small diameters coupled with their cantilever attachments to the cover, subjects their free ends to undesirable, random displacement or positioning during extrusion. This free end movement in turn tends to alter the perforation pattern in undesirable and unpredictable ways. Thus, depending on how much extrusion product flows into and fills the space between the pins and whether the area outside the pins is filled sooner or later, which cannot be predicted with accuracy, the pins will be forced outwardly in a diverging pattern, or inwardly in a converging pattern.

In the prior art, various devices have been used to divert some of the extrusion product away from the periphery of the die bore and delay its arrival thereat until a significant part of the pin bolt circle interior area has been filled with extrusion product, after which the diverted product is allowed to flow into and comingle with the center flowing product portion. In effect this tends to cause the center pin extrusion product to act as an extrusion fixture to stabilize the pins and maintain their ends parallel until the diverted product arrives and fills the surrounding area. The device is usually installed in the chamber or counterbore and has a top surface close to the pin attachment point to reduce pin length exposed to bending moment introduced by the product material flow against the sides of the pins. The surface provides a means for diverting some of the flow away from the pins to the outer region of the chamber, while the remaining product flows centrally to the pin interior region of the chamber through a central hole in the device. The material flows downwardly through the hole and adopts the shape of a shaft with the pins embedded in its outer surface and, as it exits the hole at the entrance to the die bore, it is met by the diverted material flowing in from the outer chamber region through passages also provided in the device, and the combined product continues through the bore exiting downstream as a continuous, elongated perforated extrusion product.

While use of the above mentioned distribution device has been effective to reduce pin movement and thus maintain a relatively uniform perforation pattern throughout the length of the extrusion product, it is often required to produce varying perforation patterns in such products. When so required, however, the variation should be predictable as based on a predetermined plan without requiring changes of equipment components or modification to any of the existing component parts such as, for example the cover or pin support plate, the pins and arrangement thereof, or the geometry of the die body or basic die assembly itself. Heretofore to accomplish this it has been necessary to provide a new die or die body, a new support plate or cover, to change the mandrels or perforation pins or to arrange them in new patterns, or to modify some or all of the other parts of the extrusion apparatus. It has long been known to obtain a varying pattern of perforations in an elongated extrusion product requires controlling the extrusion product flow rate by altering the direction or delaying the flow thereof within the extrusion die body in more or less specific ways. That is to say, the flow of extrusion material, particularly in the upper die body in the initial stages of the extrusion process, must be adjusted, as by metering, or otherwise altered in such a way that pin placement either remains undisturbed, i.e. random movement of the pins is prevented, or changed purposefully to provide the required variation in the perforation pattern. The present invention provides a means for accomplishing these ends by metering the flow of product in the die body so that a portion is delayed by redirection or rerouting over a relatively more circuitous path to the outer area or region of the die body chamber until the center area between the pins is filled by the remaining or undiverted product portion. In the present invention, extrusion product flow adjustment is accomplished and the perforation pattern varied accordingly without changes of or modifications to any of the other more difficult to supply or modify parts of the apparatus being required. In addition, no pin changes are required and the same support plates can be used. The only change required is the addition of an inexpensive, easy to fabricate adjustment or metering device in the form of a plate or disc positioned in the chamber between the aforesaid distribution device and the outlet side of the cover or pin support plate.

SUMMARY OF THE INVENTION

Among the objects of the present invention is the provision of a novel extrusion device or extrusion die that avoids the aforementioned problems of the prior art when utilized with an extrusion apparatus to produce elongated, perforated extrusion products.

Another object of the invention is to facilitate manufacture of the aforesaid extruded products particularly when the products are utilized as plastic material in ammunition as gun propellant therefor and which have multiple, interior, co-extensive perforations formed in predictably varying predetermined patterns.

Still another object of the invention is to provide products of the type referred to without changes of or modifications to the extrusion equipment or to the components thereof being required.

In accomplishing these and other objects, there is provided according to the present invention an extrusion apparatus and die therefor having a variety of different surface features and configurations comprising a die body having an extrusion bore therein, a counterbored chamber serving as an entrance to the bore, a cover or support plate including one or more extrusion holes therein having inlets and outlets to the chamber, an extrusion product flow diverting, distribution or regulating device in the chamber and a product flow adjustment or metering device, said device being a selected one of a variety of such devices being characterized by their common sizes and external configurations and having central holes or passages through which extrusion product flows en route to the bore of the body and being further characterized by their central holes or passages having different internal features and cross sections.

In the preferred embodiment of the invention the distribution or regulating device has a central hole substantially aligned with the die body and a slotted exterior surface and the aforementioned common holes and passages of the metering or adjustment devices are substantially centrally formed. It is also preferred that the latter device be made separately from the die body or from the distributing device and positioned in the chamber between the outlet side of the cover and the regulating device on the upper side thereof, so that the central passage comes into general alignment with the die bore. It should be understood, however, that if desired, the device can be fabricated as an integral part of the die body or plate, or of any of the other parts of the die body. It is also advantageous if the device is fabricated so as to be contained in a recess in the upper surface of the regulating or distribution device for accommodation thereby upon placement in the chamber.

As has been indicated previously, in its broadest aspects the present invention covers a device for use with apparatuses of the kind used to fabricate by extrusion, elongated plastic extrusion products containing very small, coextensive holes or perforations arranged in the product interior in predetermined patterns. In particular, the invention is used to extrude elongated gun propellant material which is thereafter cut into small bits or pieces by a process called pelletizing and loaded into artillery shells as ammunition therefor. A class of gun propellants for which the present invention has been found to be particularly useful is the extrusion of what in recent times has come to be called "low vulnerability propellants", so called because of their low sensitivity to thermally and/or impact induced explosion or premature ignition when stored or transported in armored vehicles or the like. Commonly these materials are composite gun propellants of finely divided nitromine HMX or RDX compounds (cyclotetramethylenetetranitromine or cyclotrimethylenetrinitromine, respectively) embedded or dispersed in a thermosetting polyurethane binder. In the usual composition one or more other compounds or additives are present such as, for example, curing agents and accelerators, stabilizers, burning rate modifiers, and/or plasticizers and the like often used in these compositions to impart one or more other desirable properties.

BRIEF DESCRIPTION OF THE DRAWINGS

FIG. 5 is an enlarged isometric view of the extrusion product produced by the invention after being cut to pellet size;

FIGS. 6, 7 and 8 are horizontal sections of an extrusion product produced by the invention illustrating a uniform or parallel perforation pattern, a diverging perforation pattern, and a converging perforation pattern respectively; and, FIG. 9 is an exploded front elevation of some details of the invention, parts broken away.

DESCRIPTION OF THE PREFERRED EMBODIMENT

Figures 1, 3, 4:
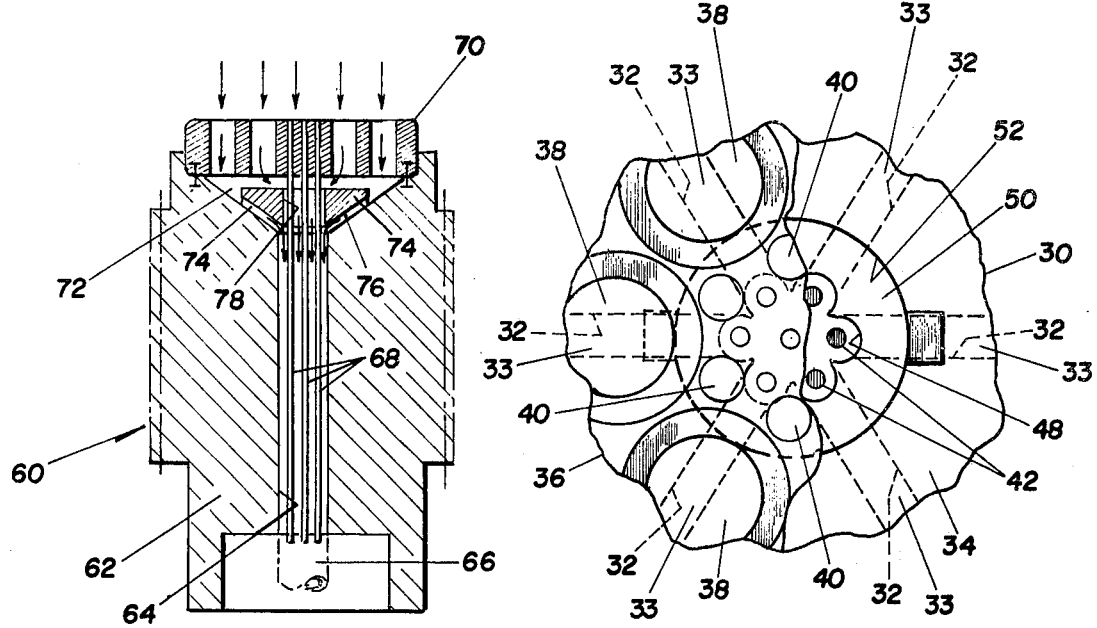
FIG. 1 is a front elevation of the lower or extrusion section of an apparatus which uses the present invention in the extrusion die thereof.
FIG. 3 is a vertical section of an extrusion die used in the prior art for producing elongated perforated extrusion products.
FIG. 4 is a view of the invention taken along line 4—4 of FIG. 2, parts broken away.

Reference is now made to FIG. 1 illustrating an exemplary or conventional extruder apparatus 10 in which an extrusion die 12 of the present invention is used to produce an elongated extrusion product or article 14 of plastic material formed, for example, of aforementioned HMX/RDX nitromine compound gun propellant.

Extruder 10 used with extrusion die 12 comprises, for example, a four inch diameter press 16 powered by a hydraulic cylinder (not shown) with a mechanical advantage of say, 3 to 1, such that an applied hydraulic pressure of 1500 psi applied to the hydraulic cylinder can supply an extrusion pressure of 4500 psi to the product in the press. The extrusion product of the above named propellant material or composition, usually stored in a solid or frozen state, is thawed for several hours at about 140° F. before loading into press 16. In press 16, this temperature is maintained, as indicated in FIG. 1 by circulating hot water from a source (not shown) through a jacket heater 18 surrounding extrusion die 12. Extrusion product 14 passes through extruder 10 and exits from the bottom thereof through extrusion die 12 as elongated, continuous strands and are laid continuously on a release agent coated rotating aluminum table or skid (not shown), or in a container, and allowed to cure. Curing of product 14 is usually completed after storage at about 150° for periods of about 16 to 20 hours after which product 14 when intended for use as gun propellant is cut into pellets 19, seen best in FIG. 5, in a rotary strand propellant cutting or pelletizing machine (also not shown).

Figure 2:
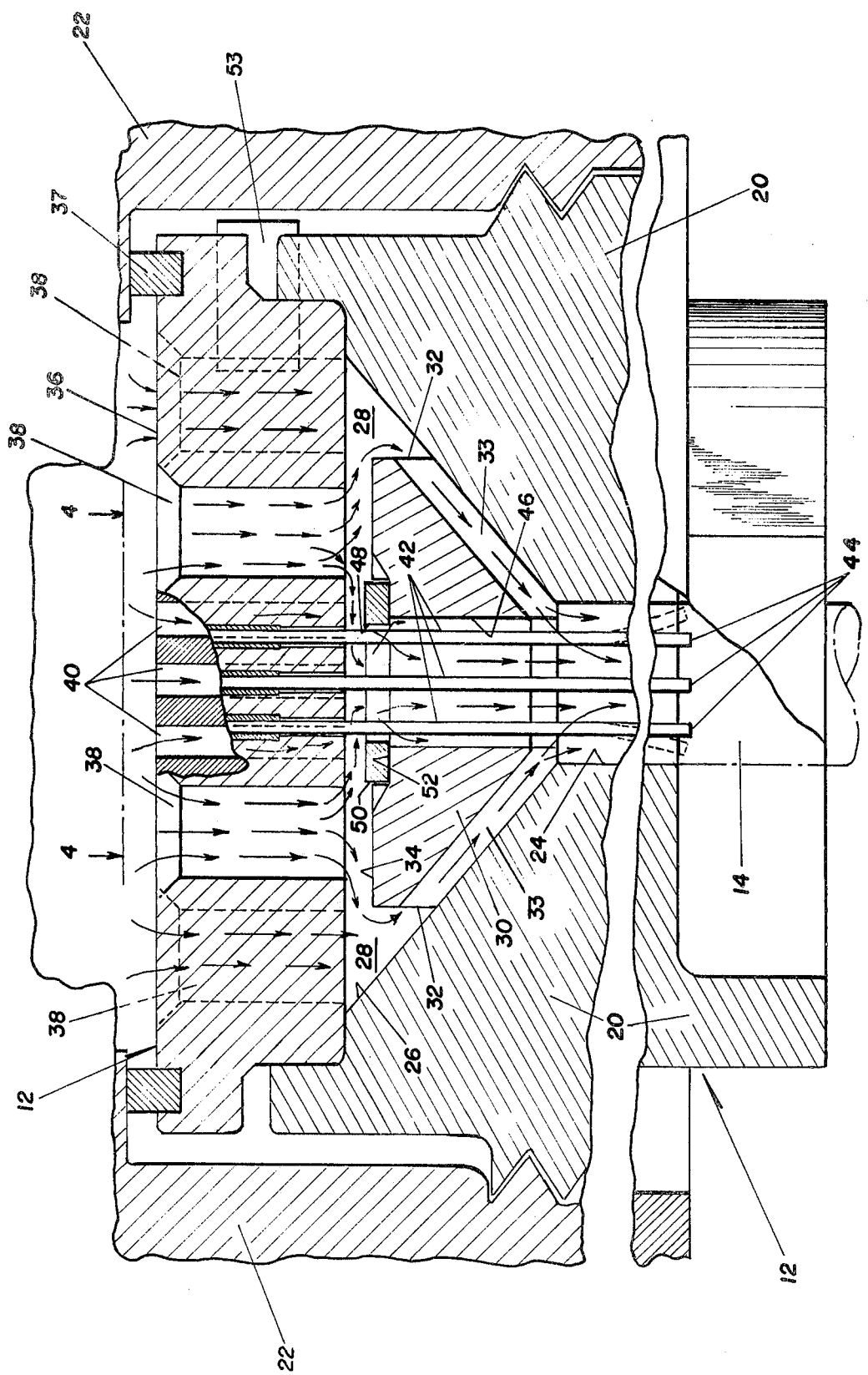
FIG. 2 is an enlarged section of the invention on a vertical plane as viewed in FIG. 1.

Referring now to FIG. 2 extrusion die 12 comprises a die body 20 adapted, as by threaded means to be installed in a housing 22 at the bottom of extruder press 16 of apparatus 10. Die body 20 has a central extrusion bore 24 which communicates with a counterbore 26 defining the walls of a chamber 28 therein. An extrusion product flow regulating or distribution device 30, contained in chamber 28 has a frusto-conical shape formed to mate with and be accommodated in counterbore 26. A plurality of slots 32, formed in the outer surface of frusto-conical distributor 30, define with counterbore 26 one or more extrusion flow passages 33 which extend between the top or flow diverting surface 34 of regulating device 30 and the bottom of chamber 28. Passages 33 terminate at the entrance to bore 24 in die body 20.

A support plate or cover 36 is positioned in body 20 over chamber 28 providing a closure therefor. Cover 36 contains a plurality of primary extrusion apertures or ports 38 formed in an outer concentric bolt circle and a plurality of secondary extrusion apertures or ports 40, formed in an inner bolt circle, as seen best in FIG. 4.

A continuous ring 37 of buna-n (acrylonitrilebutadiene) composition or like material provides a seal against leakage or passage of extrusion product into the space between housing 22 and body 20.

A plurality of perforation forming mandrels or pins 42 are supported in support plate or cover 36, being attached in cantilever fashion to the underside thereof by welding, brazing or press fitting thereinto, best seen in FIGS. 2 and 3. Perforation pins or mandrels 42 are fitted into plate 36 and arranged in a bolt circle of six outer pins surrounding a seventh pin in the center and extend from plate 36 through chamber 28 and bore 24 with their free ends 44 terminating either at the exit plane of bore 24, of which is preferred, or a short distance beyond. As seen in FIG. 2, pins 42 pass through a center hole 46 in distribution device 30, which is made large enough to accommodate them with ample clearance after passing through the center hole or orifice 48 of a metering, or orifice plate 50 positioned in chamber 28 in a recess 52 in surface 34 of plate 30. In addition, to protect pins 42 from possible damage when body 20 is threaded into housing 22 or removed therefrom an antirotation device in the form of a pin connector 53 is inserted between body and plate 36 in a recess formed in, or between the top and bottom surfaces respectively of these parts. It will be appreciated that owing to the stiffness, or highly viscous nature of extrusion material, in general, if cover plate 36 were permitted to rotate relative to body 20 when these parts are installed or removed from housing 22, pins 42 may become twisted or otherwise so bent out of shape as to render them unfit for further service. Accordingly pin connecter 53 insures against this eventuality and protects pins 42 from suffering any such damage.

As will be further explained in what follows in connection with the description of the operation of the invention, metering plate 50 constitutes a genuine advance in the art of continuous extrusion of elongated, internally perforated products by providing an improved extrusion die to the art which possesses capabilities not heretofore known. Chief among these capabilities is the extrusion of the aforementioned articles in which the aforesaid perforations are formed not only in predetermined patterns but also in varying patterns which can be predicted and reproduced with accuracy and precision.

Accordingly and with reference to FIG. 6, a cross section of a pellet of product 14 shown in FIG. 5 is depicted produced with a prior art extrusion die such as is illustrated in FIG. 3. In FIGS. 5 and 6, a perforation pattern 54 has seven perforations, six arranged in a bolt circle and the seventh formed in the center and has internal and external propellant or material webs, designated $w_i$ and $w_e$ respectively, therebetween, which webs $w_i$ and $w_e$, owing to the uniform spacing of perforations in pattern 54, are substantially of equal thicknesses. In FIGS. 7 and 8, on the other hand, different product 14 cross sections are shown illustrative of what can be obtained by using extrusion die 12 and metering plate 50 of the present invention. In these Figures perforation patterns similar in form to that of FIG. 6 are shown but with certain differences. In FIG. 7 a perforation pattern 56 has perforations which diverge or, to state it in other terms, in which the web thickness, $w_i$ is greater than $w_e$. FIG. 8 on the other hand, a still different perforation pattern 58 has perforations which converge or in which the web thickness $w_i$ is less than $w_e$. As will become apparent from what follows, patterns 56 and 58 are varying patterns which can be predicted and reproduced and also constitute only two of many possible patterns obtainable with present invention.

For a better understanding of the operation of the present invention as an improvement in the art of extrusion of elongated perforated products, reference may be had to FIG. 3 wherein a prior art extrusion die 60 is illustrated comprising a die body 62 having a central extrusion bore 64. Die 60 is used with an extrusion apparatus such as apparatus 10 of FIG. 1 to extrude viscous material (represented by the arrows in FIG. 3) and form thereby an elongated perforated product 66 (dash line object 66 in FIG. 3, dash line article 14 in FIG. 2 and pellet 19 in FIG. 5). A plurality of elongated mandrels or pins 68 are cantilevered in a perforated pin support plate 70 for passage of extrusion material into a chamber 72 formed by a counterbore in bore 64 in body 62. An extrusion flow distribution plate 74 is contained in chamber 72 to divert some of the extrusion product outwardly and into the slots 76 in the external surface of plate 74 after which it flows into bore 64. The remainder of the extrusion product flows directly into bore 64 through center, or secondary extrusion holes (not shown in FIG. 3) in support plate 70 and the central hole 78 in plate 74 and fills the space between pins 68. It will be appreciated this center flowing product thus acts as a fixture or jig which holds pins 68 in position stabilizing their free ends until the outwardly flowing product reaches bore 64 and mixes with the center flowing product at the entrance to die bore 64.

Until the introduction of devices such as distribution plate 74, random pin motion almost invariably occurred thereby altering or disturbing in some unpredictable way the perforation pattern in the extended product. In FIG. 2 this pin movement is illustrated by the dash line pin ends representing displacement of free ends 44 of pins 42. This pattern disturbance was a particularly vexing problem, not so much because of the variation caused in the perforation pattern, but rather because the change in the pattern form was unpredictable. Hence, the real problem which the present invention addresses and provides a solution to is how to supply an extrusion product of elongated form having co-extensive perforations arranged in predetermined patterns with variations which can be predicted with accuracy and precision and be reproduced with relative ease and reliability.

Accordingly, with reference to FIGS. 2 and 4, a flow adjusting device in the form of metering or orifice plate 50 has been invented to solve the problem aforementioned and enable extrusion products of the type described to be produced with accuracy, reproducibility and predictability.

In operation of the invention extrusion product material in press 16 flows, as indicated by the arrows in FIG. 2 into chamber 28 through primary extrusion ports 38 and secondary ports 40 in cover or support plate 36. A portion of this product flows radially outwardly in chamber 28 being diverted by surface 34 of distribution plate 30 after which it flows into bore 24 through slots 32 and passages 33. Simultaneously, the portion of the extrusion product flowing from ports 40 (and from ports 38) flows directly into bore 24 through center orifice 48 in metering plate 50 and center hole 46 of distribution plate 30 and joins the diverted product flowing from slots 32 through passages 33 to form extruded product 14.

As mentioned previously the space surrounded by the outer pins 42 must be totally filled with extrusion material for product 14 to be produced without disturbing or causing a displacement thereof from their desired pattern positions. In the event, however, it is desired to alter the pattern by varying pin 42 placement, the accomplishment of which is a function of the bending forces acting on pins 42 introduced by the onrush of material flow against their sides, it follows that the effect of this material onrush can be minimized or maximized by decreasing or increasing, respectively, the amount of pin 42 exposed to the bending force. In the present invention, upper face 34 of distribution plate 30 which diverts material or product flow within die body 20, is positioned in proximity to pin support plate 36 (in practice a distance limited to about two pins 42 diameters), thus exposing only a small portion of pins 42 length to the bending force. As extrusion material flows into center hole 46 of distribution plate 30, it forces pins 42 to move outwardly or inwardly depending on how much extrusion product is allowed to fill the space within the pin 42 bolt circle. Pins 42 will remain static if within center hole 46 the interior pin 42 space only is filled. If orifice 48 is reduced or otherwise shaped, as in FIG. 4, with a circular cross section made up of converging (or diverging) arcs or cusps, to permit the outer area of the product to be filled first, pin 42 motion will be inwardly in a converging pattern. If, on the other hand, product flows to fill the interior area of the product first by making orifice 48 sufficiently large, pins 42 will diverge.

In essence, the present invention is a metering or extrusion product flow adjustment device in the form of metering plate 50 which is one selected from a variety of such plates each having external shapes and external dimensions in common and internal shapes and dimensions different from one another, depending upon the varying perforation pattern desired to be produced by the extrusion die and the manner in which the extrusion product flow is directed herein, i.e., whether inwardly or outwardly directed. The present invention permits the extrusion of perforated extrusion products according to product 14 wherein the perforation patterns can be varied almost at will and in different shapes and sizes.

In addition, present invention also has the advantage that metering plate 50 can be made as a separate part easily replaceable which in use for adjusting extrusion product flow, particularly in the critical upper regions of die bore 24 provides economies in the production of products having aforesaid varying perforation patterns and/or configurations. It will be appreciated that these economies are obtained because these results can be achieved without changes of or modifications to pin support plate 36, die body 20, pins 42 or their arrangement in plate 36, distribution plate 30 or any of the other parts or components of the die assembly being required. Only one change is necessary, the simple act of replacing by insertion one metering plate 50 for another from a variety of such plates which can be made readily available having a different orifice 48. It is further evident that the relatively simple shape and small size of metering plate 50 lends itself well to being inexpensively produced and/or modified according to order as requirement dictates. No other die modifications or changes will be required to accomplish the desired end thereby reducing tooling costs and decreasing manufacturing lead times. Furthermore, it will be realized that use of the present invention insures repeatability and/or reproducibility of perforation patterns over a wide range of rheological properties of the extrusion material and that all of these benefits are obtained with a high degree of predictability.

What is claimed is:

1. An extrusion die for producing elongated products having longitudinally co-extending perforations, said perforations arranged in predetermined, varying patterns comprising
   (a) a body having a central bore and an open chamber communicating with said bore;
   (b) cover means for said chamber having at least one aperture for passage of extrusion product into said chamber;
   (c) means in said body for regulating the flow of said product in said chamber including means for diverting a portion of said product and defining a passageway for said diverted portion to flow to said bore and means defining a passageway for the remaining product in said chamber to flow to said bore, said diverted flow passageway being relatively more circuitous than said remaining product passageway;
   (d) means in said body for forming said perforations in said patterns in said product; and
   (e) a selected one of a variety of means positionable in cooperating relationship with said regulating means for metering the flow of said product in said body for effecting an adjustment in the distribution of product in said chamber and thereby forcing a positional adjustment of said perforation forming means in said bore to provide a selected one of said predetermined, varying perforation patterns.

2. An extrusion die as in claim 1 wherein each of said variety of means for metering said product comprises an orifice plate, said plate being a selected one of a variety of plates, said variety of plates being characterized by their common size and external configuration for accomodation in cooperating relation by said die body between said cover means and said regulating means in said chamber and being further characterized by their orifices having different internal configurations and cross sections which determine the distribution adjustment of said product in said chamber and thereby predictably determine said predetermined varying perforation patterns.

3. An extrusion die as in claim 1 wherein the perforation forming means comprises a plurality of die pins supported in said cover means on ends fixed thereto with opposite ends being free and extending downwardly into said bore in substantially parallel relation.

4. An extrusion die as in claim 1 in which the chamber is defined by a counterbore in said bore and said regulating means is contained therein in substantially cooperating and conforming relation therewith.

5. An extrusion die as in claim 4 in which said regulating means includes at least one slot defining with a wall of said counterbore said diverted product flow passageway.

6. An extrusion die as in claim 1 wherein the regulating means is a truncated conical plate in said chamber having a plurality of circumferential spaced apart slots in its outer surface, said slots defining with said chamber flow passages for said diverted portion of said extrusion product.

7. An extrusion die as in claim 1 wherein the means defining said remaining product flow passageway is a central hole in said regulating means.

8. An extrusion die as in claim 1 wherein each of said metering means is an orifice plate positioned between regulating means and said cover in said chamber.

9. An extrusion die as in claim 8 wherein the orifice in said orifice plate is circular in cross section.

10. An extrusion die as in claim 9 wherein the circular orifice is made up of a plurality of converging arcs.

11. An extrusion die as in claim 9 wherein the circular orifice is made up of a plurality of diverging arcs.

12. In an extrusion die for producing elongated extruded product having longitudinally co-extensive perforations arranged in predetermined varying patterns comprising a die body having a central bore and a counterbore defining chamber, a cover for the chamber having inlet and outlet sides and at least one aperture connecting the sides for passage of extrusion material into said chamber and bore in the body, extrusion material flow regulating means in the chamber whereby a portion of the extrusion material flowing into the chamber from the inlet side to the outlet side of the cover to the bore is diverted and caused to flow through a relatively more circuitous path to reach said bore than the remaining portion of the extrusion material flowing directly to the bore, and means for forming said perforations in said predetermined patterns, the improvement comprising;

a variety of extrusion material metering means each of which is selectively positionable in operative association with said regulating means and includes an orifice for adjusting the distribution in the flow of said extrusion material flowing in said chamber and thereby causing said extrusion material to effect a positional adjustment of said perforation forming means in said bore to provide said predetermined varying perforation patterns.

13. Am extrusion die as in claim 12 wherein each of the variety of metering means is a plate containing said orifice, said plate being a selected one of a variety of plates, said variety of plates being characterized by their common external surface configurations for accomodation by said body between said cover and said regulating means in said chamber, and being further characterized by their different internal surface configurations and orifices which determine the distribution adjustment of said material flow relative to said mandrels or pins and thereby predictably alter the pattern of said perforations.

14. An extrusion die as in claim 13 wherein said orifice in said selected plate is circular in cross section.

15. An extrusion die as in claim 14 wherein the circular cross section includes at least one converging arc.

16. An extrusion die as in claim 14 wherein the circular cross section includes at least one diverging arc.

17. An extrusion die as in claim 13 wherein said selected plate is made integrally with said regulating means.

18. An extrusion die as in claim 13 wherein said orifice in said selected plate is non-circular in cross section.

19. For use in an extrusion device including a die body, an extrusion material flow metering device for adjusting the distribution in the flow of extrusion material in said die body during the manufacturing by extrusion of elongated products having internal, longitudinally co-extensive perforations which are formed by an array of cantilevered mandrels or die pins positioned in the die body in predetermined patterns comprising;

an orifice-containing removable plate inserted in said die body in extrusion material flow receiving and adjustment relation for causing said material flow to forcibly effect a positional adjustment of said mandrels or pins in the die body and thereby alter the pattern of said perforations in said product, said plate being a selected one of a variety of plates being characterized by their common external surface configurations, and being further characterized by their different internal orifices which determine the distribution adjustment of said material flow relative to said mandrels or pins and thereby predictably alter the pattern of said perforations in said product.

20. The metering device of claim 19 wherein the orifice in said plate is circular.

21. The metering device of claim 20 wherein the circular orifice in said plate has at least one converging surface.

22. The metering device of claim 20 wherein the circular orifice in said plate has at least one diverging surface.

23. The metering device of claim 19 wherein the orifice in said plate is non-circular.

* * * * *